(12) United States Patent
Denk

(10) Patent No.: US 7,489,722 B2
(45) Date of Patent: Feb. 10, 2009

(54) APPARATUS FOR PRODUCTION OF SCRAMBLING CODES AND PREAMBLES

(75) Inventor: Robert Denk, Grafing (DE)

(73) Assignee: Infineon Technologies AG, Munich (DE)

( * ) Notice: Subject to any disclaimer, the term of this patent is extended or adjusted under 35 U.S.C. 154(b) by 664 days.

(21) Appl. No.: 11/014,274

(22) Filed: Dec. 16, 2004

(65) Prior Publication Data
US 2005/0152265 A1   Jul. 14, 2005

(30) Foreign Application Priority Data
Dec. 17, 2003   (DE)   ................. 103 59 268

(51) Int. Cl.
H04B 1/00   (2006.01)
(52) U.S. Cl. ................... 375/146; 375/140
(58) Field of Classification Search ........... 375/145, 375/140, 146; 370/209
See application file for complete search history.

(56) References Cited

U.S. PATENT DOCUMENTS

| | | | | |
|---|---|---|---|---|
| 4,215,402 | A * | 7/1980 | Mitchell et al. | 711/216 |
| 5,335,249 | A * | 8/1994 | Krueger et al. | 375/149 |
| 6,567,461 | B1 * | 5/2003 | Moon et al. | 375/145 |
| 6,584,091 | B2 * | 6/2003 | Lomp et al. | 370/342 |
| 6,778,835 | B2 * | 8/2004 | You et al. | 455/455 |
| 7,003,269 | B2 * | 2/2006 | Willenegger | 455/102 |
| 7,006,428 | B2 * | 2/2006 | Proctor et al. | 370/208 |
| 7,061,967 | B2 * | 6/2006 | Schelm et al. | 375/147 |
| 7,295,531 | B2 * | 11/2007 | Wheatley et al. | 370/328 |
| 2001/0046220 | A1 * | 11/2001 | Koo et al. | 370/335 |
| 2002/0122468 | A1 | 9/2002 | Belkerdid | |
| 2002/0154678 | A1 * | 10/2002 | Doetsch et al. | 375/130 |
| 2003/0099357 | A1 | 5/2003 | Ryu et al. | |
| 2003/0120994 | A1 * | 6/2003 | Dent | 714/786 |
| 2007/0091985 | A1 * | 4/2007 | Mesecher | 375/141 |

FOREIGN PATENT DOCUMENTS

| | | |
|---|---|---|
| DE | 198 21 004 A1 | 12/1999 |
| EP | 1 343 265 A1 | 9/2003 |
| WO | WO 01/05081 A1 | 1/2001 |

OTHER PUBLICATIONS

3GPP TS 25.213 (Universal Mobile Telecommunications System), version 5.4.0 (Sep. 2003) "3$^{rd}$ Generation Partnership Project; Technical Specification Group Radio Access Network; Spreading and modulation (FDD)", 28 pgs.
3GPP TS 25.211 (Universal Mobile Telecommunications System), version 5.5.0 (Apr. 2001), 3$^{rd}$ Generation Partnership Project; Technical Specification Group Radio Access Network; Physical channels and mapping of transport channels onto physical channels (FDD), 51 pgs.

* cited by examiner

*Primary Examiner*—David B Lugo
(74) *Attorney, Agent, or Firm*—Eschweiler & Associates, LLC

(57) ABSTRACT

The present invention is directed to an apparatus for production of scrambling codes that are used for scrambling binary signals transmitted via physical channels in a mobile radio system. The apparatus is also configured to produce preambles that are sent on a physical channel in order to control the access to that particular physical channel. The apparatus includes a scrambling code generator for production of the scrambling codes, and a preamble generator for production of non-scrambled preambles, and at least one multiplier for scrambling the non-scrambled preambles using associated scrambling codes.

19 Claims, 6 Drawing Sheets

APPARATUS FOR PRODUCTION OF SCRAMBLING CODES AND PREAMBLES

REFERENCE TO RELATED APPLICATIONS

This application claims the benefit of the priority date of German application DE 103 59 268.7, filed on Dec. 17, 2003, the contents of which are herein incorporated by reference in their entirety.

FIELD OF THE INVENTION

The present invention relates to an apparatus for production of scrambling codes and preambles and, in particular, to the production of scrambling codes for scrambling binary signals which are transmitted in physical channels in a mobile radio system, and to the production of preambles which are sent on a physical channel in order to control the access to that particular physical channel.

BACKGROUND OF THE INVENTION

One modern example of a mobile radio system is the Universal Mobile Telecommunications System (UMTS). The basic architecture of a UMTS mobile radio system has, inter alia, mobile stations (User Equipment (UE)) and a radio access network (UMTS Terrestrial Radio Access Network (UTRAN)). The radio access network contains devices for transmission of data by radio, such as base stations which, in UMTS mobile radio systems, are referred to as node B. The base stations each supply a specific area or a cell in which mobile stations may be located. The interface between a mobile station and a base station, which communicate by radio without the use of wires, is referred to as a radio interface (Uu interface).

The following text includes parts of the technical specification 3GPP TS 25.213, V5.4.0 (2003-09), Spreading and modulation (FDD) and of the technical specification 3GPP TS 25.211, V5.5.0 (2003-09), Physical channels and mapping of transport channels (FDD), for the 3rd Generation Partnership Project (3GPP), Technical Specification Group Radio Access Network.

In a UMTS mobile radio system, digital data to be transmitted is first of all subjected to channel coding. The digital data is, in the process, provided with redundancy and is protected against errors during transmission via a mobile radio channel that is subject to interference, and/or error correction is made possible in the respective data receiver. The digital data is then distributed between physical channels by means of a multiple access method, within the available transmission bandwidth. Finally, the digital data is digitally modulated, in order to be transmitted via a mobile radio channel. The mobile radio channel is subdivided for a transmission mode and for a reception mode, by means of a duplexing method.

The multiple access method used in the UMTS Standard and in the 3GPP Standard (Third Generation Partnership Project) is the code division multiple access method (CDMA), in which a bipolar data bit stream to be transmitted is multiplied by a subscriber-specific bipolar code sequence, and/or by a spreading code, and is spread. The elements of the spreading code are referred to as chips, in order to make it possible to draw a semantic distinction between them and the bits in the data bit stream. In principle, chips are nothing more than bits. The multiplication of the data bit stream by the chip stream results in a bipolar data stream, once again. In general, the rate of the chip stream is a multiple of the rate of the data bit stream, and is governed by the length of the spreading code, which is indicated by a spreading factor (SF). The spreading factor corresponds to the number of chips per bit. If the chip rate on the radio transmission path between transmitters and receivers is constant, the data bit rate that is represented in the chip stream is dependent only on the spreading factor of the respective subscriber-specific spreading code. In the UMTS mobile radio system, orthogonal spreading codes with a variable spreading factor (OVSF=Orthogonal Variable Spreading Factor) are used, in order to make it possible to use variable data rates. The data rate may in this case fluctuate in a range from 32 kbit/s to 2 Mbit/s.

The modulation method used in the UMTS mobile radio system is four-phase keying (QPSK=Quaternary Phase Shift Keying), in which two successive chips in a chip sequence to be transmitted are in each case combined to form a chip pair. A chip pair is in each case mapped on the complex plane onto a symbol in a symbol space which is covered by a real in-phase branch (I) and an imaginary quadrature branch (Q) of the QPSK modulation method, with the symbol having four elements. Owing to the four-value modulation method, two chips are in each case transmitted in each modulation step. The gross chip rate is thus twice as high as the modulation rate.

In the case of UMTS mobile radio systems, the time-division duplexing method (TDD) or the frequency-division duplexing method (FDD) may be used to separate transmission signals and received signals in a base station or in a mobile station, and to separate the uplink from the mobile station to the base station, and the downlink from the base station to the mobile station. In the FDD method, the stations each transmit and receive in separate frequency bands. In this case, the transmission band of one station is the reception band of the other station, and vice versa.

The wideband code division multiple access method (WCDMA) has been chosen by the ETSI (European Telecommunications Standard Institute) as the basis for the FDD-UMTS radio interface (Uu interface), allowing operation at the same data rate in both transmission directions, and symmetrical uplink/downlink operation. According to the UMTS Standard, data is transmitted between the base stations and the mobile stations in time frames. Each time frame in each case has 15 time slots, which each contain 2560 chips. A time frame lasts for 10 ms, so that a time slot has a duration of 666 µs, and a chip has a duration of about 0.2604 µs. The chip rate is 38,400 chips per time frame, or 3.84 Mchips/s.

The multiple access method is used by all the subscribers in order to apply a fingerprint to their payload data by means of a subscriber-specific spreading code, thus allowing the transmitted signal to be reproduced from the sum of the received signals. The bits in the data bit stream can be recovered from the received chip sequence in the receiver by repeating the multiplication process. For this purpose, the chip stream is once again multiplied or correlated, in the correct phase, by the same spreading code which has already been used in the transmitter, thus resulting in the transmitted data bit stream once again.

Different data bit streams, which originate from one transmitter and are intended to be transmitted in parallel are multiplied by different, orthogonal spreading codes, and are then added, in the real in-phase branch and in the imaginary quadrature branch in the QPSK modulation method. The complex sum signal is then also scrambled, which is carried out by complex multiplication of the sum signal, chip-by-chip and based on time frames, by a specific complex scrambling code. In the FDD mode in the UMTS mobile radio system, the scrambling code is station-specific, that is to say each base station and each mobile station use a different scrambling code.

In contrast to the spreading code, the scrambling code is not used for band spreading, but only for orthogonal coding. The scrambling code thus has a fixed length of exactly 38,400 chips, which corresponds precisely to the length of one time frame. Each of these time frames is multiplicatively coded chip-by-chip by an associated scrambling code. Owing to the QPSK modulation method that is used by UMTS mobile radio systems, two bit streams are transmitted at the same time, with each bit stream being coded separately. Two scrambling codes thus exist in each case, a "real" and an "imaginary" scrambling code for the in-phase branch and for the quadrature branch, respectively, in the QPSK modulation method. $2^{24}$ long scrambling codes each comprising 38,400 chips and $2^{24}$ short scrambling codes each comprising 256 chips also exist.

FIG. 5 shows a known generator for production of long scrambling codes for the uplink. The chips in the scrambling codes are produced by means of shift registers, with 25 series-connected registers being used in each shift register on the uplink. Information is in each case shifted from an output of one register to an input of a next register by means of a clock signal at 3.84 MHz, which corresponds to the chip rate of 3.84 Mchips/s. The registers are fed back via modulo-2 adders (MOD2), for example exclusive-OR gates (XOR).

The long scrambling codes $c_{long,1,n}$ and $c_{long,2,n}$ are formed by position-by-position modulo-2 addition of 38,400 chip segments of two binary code sequences x and y, which are produced by means of two polynomials. The x code sequence is constructed using a polynomial $X^{25}+X^3+1$. The y code sequence is constructed using a polynomial $X^{25}+X^3+X^2+X+1$. The resultant code sequences thus form segments of a set of gold code sequences. The long scrambling code $c_{long,2,n}$ is a version of the long scrambling code $c_{long,1,n}$ which has been shifted through 16,777,232 chips. The binary 24-bit representation of the scrambling code number n is $n_{23}, n_{22}, \ldots, n_0$, where $n_0$ is the least significant bit (LSB) and $n_{23}$ is the most significant bit (MSB). The x code sequence depends on the chosen scrambling code number n, and is referred to as $x_n$. $x_n(i)$ and $y(i)$ denote the i-th symbol in the code sequences $x_n$ and y, respectively. The code sequences $x_n$ and y are constructed as follows.

At the start of the production of the scrambling code, the registers are initialized with predetermined bits. The initial conditions are:

$$x_n(0)=n_0, x_n(1)=n_1, \ldots, x_n(22)=n_{22}, x_n(23)=n_{23}, x_n(24)=1. \quad (1)$$

$$y(0)=y(1)=\ldots=y(23)=y(24)=1 \quad (2)$$

The following recursive definitions apply to successive symbols:

$$x_n(i+25)=x_n(i+3)+x_n(i) \text{ modulo } 2, i=0, \ldots, 2^{25}-27. \quad (3)$$

$$y(i+25)=y(i+3)+y(i+2)+y(i+1)+y(i) \text{ modulo } 2, i=0, \ldots, 2^{25}-27. \quad (4)$$

The binary gold code sequence $z_n$ is defined by:

$$z_n(i)=x_n(i)+y(i) \text{ modulo } 2, i=0, 1, 2, \ldots, 2^{25}-2 \quad (5)$$

The real gold code sequence $z_n$ is:

$$z_n(i) = \begin{cases} +1 & \text{if } z_n(i) = 0 \\ -1 & \text{if } z_n(i) = 1 \end{cases} \text{ for } i = 0, 1, K, 2^{25}-2. \quad (6)$$

The real long scrambling codes $c_{long,1,n}$ and $c_{long,2,n}$ are now defined as follows:

$$c_{long,1,n}=Z_n(i), i=0, 1, 2, \ldots, 2^{25}-2; \text{ and} \quad (7)$$

$$c_{long,2,n}=Z_n((i+16\ 777\ 232)\text{modulo}(2^{25}-1)), i=0, 1, 2, \ldots, 2^{25}-2. \quad (8)$$

The complex long scrambling code is, finally, defined by:

$$c_{long,n}(i)=c_{long,1,n}(i)(1+j(-1)^i c_{long,2,n}(2\lfloor i/2 \rfloor)), \quad (9)$$

where $i=0, 1, \ldots, 2^{25}-2$ and $\lfloor\ \rfloor$ represents the integer component of the number i/2.

FIG. 6 shows a known generator for production of short scrambling codes for the uplink. The short scrambling codes $c_{short,1,n}(i)$ and $c_{short,2,n}(i)$ are defined by a code sequence from the family of periodically extended S(2) codes. The binary 24-bit representation of the scrambling code number n is $n_{23}, n_{22}, \ldots, n_0$. The n-th quaternary S(2) code sequence $z_n(i)$, $0=n=16,777,215$ is obtained by modulo-4 addition (MOD4) of three code sequences, a quaternary code sequence a(i) and two binary code sequences b(i) and d(i), with the initialization of the three code sequences being defined from the scrambling code number n. The code sequence $z_n(i)$ whose length is 255 is produced using the following relationship:

$$z_n(i)=a(i)+2b(i)+2d(i) \text{ modulo } 4, i=0, 1, \ldots, 254, \quad (10)$$

with the quaternary code sequence a(i) being produced recursively by means of the polynomial $$g_0(x)=x^8+x^5+3x^3+x^2+2x+1, \text{ where}$$

$$a(0)=2n_0+1 \text{ modulo } 4;$$

$$a(i)=2n_i \text{ modulo } 4, i=1, 2, \ldots, 7:$$

$$a(i)=3a(i-3)+a(i-5)+3a(i-6)+2a(i-7)+3a(i-8)\text{modulo } 4, i=8, 9, \ldots, 254; \quad (11)$$

the binary code sequence b(i) being produced recursively by the polynomial $$g_1(x)=x^8+x^7+x^5+x+1, \text{ where}$$

$$b(i)=n_{8+I} \text{ modulo } 2, i=0, 1, \ldots, 7;$$

$$b(i)=b(i-1)+b(i-3)+b(i-7)+b(i-8)\text{modulo } 2, i=8, 9, \ldots, 254; \quad (12)$$

and the binary code sequence d(i) being produced recursively by the polynomial $$g_2(x)=x^8+x^7+x^5+x^4+1, \text{ where}$$

$$d(i)=n_{16+I} \text{ modulo } 2, i=0, 1, \ldots, 7;$$

$$d(i)=d(i-1)+d(i-3)+d(i-4)+d(i-8)\text{modulo } 2, i=8, 9, \ldots, 254; \quad (13)$$

The code sequence $z_n(i)$ is extended to a length of 256 chips, by setting $z_n(255)=z_n(0)$. The mapping of $z_n(i)$ onto the real binary short scrambling codes $c_{short,1,n}(i)$ and $c_{short,2,n}(i)$, where $i=0, 1, \ldots, 255$ is shown in the following Table 1.

TABLE 1

| $Z_n(i)$ | $C_{short,1,n}(i)$ | $C_{short,2,n}(i)$ |
| --- | --- | --- |
| 0 | +1 | +1 |
| 1 | −1 | +1 |
| 2 | −1 | −1 |
| 3 | +1 | −1 |

The complex short scrambling code $c_{short,n}$ is defined by:

$$c_{short,n}(i) = c_{short,1,n}(i \bmod 256)(1+j(-1)^i c_{short,2,n}(2\lfloor(i \bmod 256)/2\rfloor)) \quad (14)$$

where i=0, 1, 2, ... and $\lfloor\ \rfloor$ is the integer component of the number (i mod 256)/2.

Information is transmitted in the uplink from the mobile stations via a radio link to the base stations. The information from various mobile stations is coded using the CDMA multiple access method and transmitted via a common frequency channel or radio channel to those base stations that are in radio contact with the mobile stations in physical channels that are combined to form a radio signal. In the FDD mode a physical channel is defined by the spreading code and by the frequency channel. On the FDD uplink, the physical channels are also distinguished by the phase angle of the carrier signal. Physical channels thus use either a cosine or sine oscillation as the carrier signal. This is achieved by transmitting a different physical channel via the real in-phase branch (I) of the QPSK modulation method than via the imaginary quadrature branch.

A distinction is in general drawn between so-called dedicated physical channels and common physical channels. A dedicated physical channel is used exclusively by one link, and is reassigned when setting up a connection and, possibly, during the connection. Common physical channels are used simultaneously or alternately by a number of links.

Physical channels in the FDD mode are, for example, the dedicated physical data channel (DPDCH), the dedicated physical control channel (DPCCH), the physical random access channel (PRACH) and the physical common packet channel (PCPCH). In addition to the physical channels, indicator channels also exist in the FDD mode. These are single-bit or two-bit messages, which are spread by means of a spreading code and are transmitted at a specific time. An indicator channel is characterized by the spreading code, the frequency channel and the time. Indicator channels are used for notification and for indication of specific events. One example of an indicator channel is the acquisition indication channel (AICH).

The dedicated physical data channel DPDCH exists only on the uplink, and is used for transmission of coded and interleaved payload and signalling data from higher layers of the UTRA protocol stack. One DPDCH, or two or more in parallel, may be used for transmission. If two or more DPDCHs are used in parallel, all of the DPDCHs must have the same spreading factor, and a maximum of six DPDCHs can be transmitted in parallel. In this case, the DPDCHs are distributed as uniformly as possible between the in-phase and quadrature branches of the QPSK modulation method.

The dedicated physical control channel DPCCH is a physical channel for controlling the data transmission between partner instances of the physical layer of the UTRA protocol stack for the uplink. Only information for the physical layer, for example power control commands, transport format indicators or pilot bits, is transmitted via this link. One and only one DPCCH is associated with each layer-1 connection.

The physical random access channel PRACH is used for random access, and exists only on the uplink. The PRACH is used to transmit messages for the random access transport channel (RACH) for the UTRA protocol stack. The RACH may in this case be used both for setting up a call and for transmission of small data packets. One typical operational use for the PRACH is, for example, the request for radio resources in a mobile radio system when a mobile station is setting up a telephone call. Since all of the mobile stations in a cell use the PRACH jointly in order to signal to the mobile radio system that radio resources are required, a specific method must be used to ensure that collisions do not occur between different mobile stations when accessing the PRACH. The method which ensures this is the slotted ALOHA method. Random accesses to the PRACH may take place at defined times, in access time slots. An access time slot corresponds to the duration of 5120 chips, that is to say an access time slot is twice as long as a normal time slot, such as that for a DPDCH. Fifteen access time slots exist within 20 ms and each define one access channel. The random access is subdivided into a competition phase and a transmission phase. In the competition phase, the mobile stations use the slotted ALOHA method to access the PRACH within an access time slot by transmission of a PRACH preamble. In the transmission phase, a PRACH message part is then transmitted.

The common physical packet channel PCPCH is, finally, used for transmission of data packets of the common packet transport channel (CPCH) in the UTRA protocol stack in accordance with a carrier sense multiple access method with collision detection (CSMA/CD). Analogously to the physical random access channel PRACH, the mobile station can start transmission in the PCPCH in specific access time slots. The access time slot in which the mobile station may transmit depends on the current system frame number (SFN).

The scrambling code for scrambling the physical channels DPCCH/DPDCH on the uplink may be either a long or a short scrambling code. When the scrambling code is produced, different code sequences that form a component of the scrambling code are used for the long and the short scrambling code, as defined in the following text. The n-th uplink scrambling code for the physical channels DPCCH/DPDCH, which is referred to as $S_{dpch,n}$ is defined as $$S_{dpch,n}(i) = c_{long,n}(i), i=0, 1, \ldots, 38,399; \quad (15)$$

when long scrambling codes are used, and is defined as $$S_{dpch,n}(i) = c_{short,n}(i), i=0, 1, \ldots, 38,399; \quad (16)$$

when short scrambling codes are used. The lowest index i in each case corresponds to the chip that is transmitted first in time.

In order to scramble the physical channel PRACH, scrambling codes must be produced for scrambling the PRACH message parts and the PRACH preambles in the PRACH. The scrambling code that is used for the message part of the physical channel PRACH is 10 ms long, and there are 8192 different defined PRACH message scrambling codes. The n-th PRACH message part scrambling code, which is referred to as $S_{r-msg,n}$, where n=0, 1, ..., 8191, is based on the long scrambling code, and is defined as:

$$S_{r-msg,n}(i) = c_{long,n}(i+4096), i=0, 1, \ldots, 38,399; \quad (17)$$

where the lowest index i corresponds to the chip which is transmitted first in time. The PRACH message part scrambling code corresponds to a scrambling code that is used for the PRACH preamble, or to a PRACH preamble scrambling code. The same scrambling code number is used for both scrambling codes for a PRACH, that is to say if the PRACH preamble scrambling code is $S_{r-pre,n}$, then the PRACH message part scrambling code is $S_{r-msg,n}$, with the scrambling code number n being the same for both scrambling codes.

The PRACH preamble $C_{pre,n}$ is a complex sequence formed from the PRACH preamble scrambling code $S_{r-pre,n}$ and a PRACH preamble signature $C_{sig,s}$ as follows:

$$C_{pre,n,s}(i) = S_{r-pre,n}(i) \times C_{sig,s}(i) \times e^{j(\frac{\pi}{4}+\frac{\pi}{2}i)}, \quad (18)$$
$$i = 0, 1, 2, 3, \ldots, 4095;$$

where i=0 corresponds to the chip which is transmitted first in time.

The PRACH preamble scrambling code is formed from the long scrambling code. There are a total of 8192 PRACH preamble scrambling codes. The n-th PRACH preamble scrambling code, n=0, 1, ..., 8191, is defined as:

$$S_{r-pre,n}(i) = c_{long,1,n}(i), i=0, 1, \ldots, 4095. \quad (19)$$

The PRACH preamble signature comprises 256 repetitions of a signature $P_s(n)$, with a length of 16 chips, where n=0 ... 15. This is defined as follows:

$$c_{sig,s}(i) = P_s(i \bmod 16), i=0, 1, \ldots, 4095. \quad (20)$$

The signature $P_s(n)$ with the signature number s originates from a set of 16 Hadamard codes of length 16. There are therefore 16 different PRACH preambles, each having 4096 chips, for each access time slot, so that 16 parallel access channels are available for each access time slot, by means of which mobile stations can gain access without any collisions.

A mobile station that wishes to access the PRACH chooses an available access time slot, and then one of the 16 PRACH preambles. The PRACH preamble is then transmitted with a low transmission power, and the station waits for an acknowledgement, which is received via the indicator channel AICH. If no acknowledgement is received from the base station, or the mobile station receives a negative acknowledgement, then it chooses a new access time slot and a new PRACH preamble, and transmits this with a somewhat higher transmission power. This process is repeated until a maximum number of attempts is reached without a positive acknowledgement having been received. When a successful competition phase occurs, that is to say there is a positive acknowledgement, the mobile station transmits its PRACH message with a delay of three or four time slots. The PRACH message bits are transmitted via the real in-phase branch (I) of the QPSK modulation method.

A PCPCH access transmission has one or more PCPCH access preambles with 4096 chips, a PCPCH collision detection preamble with 4096 chips, a PCPCH power control preamble with a length of either 0 or 8 time slots, and a PCPCH message part of variable length, of N×10 ms. The set of scrambling codes which is used for the PCPCH message part has a length of 10 ms, is cell-specific, and each PCPCH message part scrambling code corresponds to the signature and to the access channel element which is used by the PCPCH access preamble. Both long and short scrambling codes may be used in order to scramble the PCPCH message part. There are 64 scrambling codes on the uplink, which are defined per cell, and there are 32,768 different PCPCH scrambling codes, which are defined in the system.

When the long scrambling codes are used, the n-th PCPCH message part scrambling code which is referred to as $S_{c-msg,n}$ where n=8192, 8193, ..., 40,959 is based on the long scrambling code, and is defined as:

$$S_{c-msg,n}(i) = c_{long,n}(i), i=0, 1, \ldots, 38,399. \quad (21)$$

When the short scrambling codes are used, the n-th PCPCH message part scrambling code, which is referred to as $S_{c-msg,n}$, where n=8192, 8193, ..., 40,959 is based on the short scrambling code, and is defined as:

$$S_{c-msg,n}(i) = c_{short,n}(i), i=0, 1, \ldots, 38,399. \quad (22)$$

The lowest index i corresponds to the chip which is transmitted first in time.

The scrambling code for the PCPCH power control preamble is the same as the PCPCH message part scrambling code. The phase of the scrambling code is chosen such that the end of the code is aligned with the time frame boundary at the end of the PCPCH power control preamble.

The PCPCH access preambles $C_{c-acc,n,s}$ are complex sequences, in a similar way to the PRACH preambles. The PCPCH access preambles are formed from PCPCH preamble scrambling codes $S_{c-acc,n}$ and from a PCPCH preamble signature $C_{sig,s}$ as follows:

$$C_{c-acc,n,s}(i) = S_{c-acc,n}(i) \times C_{sig,s}(i) \times e^{j(\frac{\pi}{4}+\frac{\pi}{2}i)}, \quad (23)$$
$$i = 0, 1, 2, 3, \ldots, 4095.$$

The PCPCH access preamble scrambling code is formed from the long scrambling codes. There are a total 40,960 PCPCH access preamble scrambling codes. The n-th PCPCH access preamble scrambling code, where n=0 ..., 40,959, is defined as:

$$S_{c-acc,n}(i) = c_{long,1,n}(i), i=0, 1, \ldots, 4095. \quad (24)$$

The PCPCH access preamble uses the same 16 signatures as those for the PRACH, although a smaller number of defined code sequences can be used for the PCPCH than for the PRACH. The PCPCH access preamble scrambling code may also be the same as the PRACH preamble scrambling code.

A mobile station that wishes to access the PCPCH first of all uses the access time slots to transmit the PCPCH access preambles before transmitting the actual messages. As already described for the PRACH, these PCPCH access preambles are transmitted with an increasing power level until an acknowledgement is received via the AICH from the base station.

In UMTS mobile radio systems, the base stations (node B) each supply one or more cells in which mobile stations may be located. The base stations process received radio signals from the mobile stations located in their cells, and the mobile stations process radio signals from the surrounding base stations. This processing comprises, inter alia, error correction via the channel coding, spreading and despreading in accordance with the CDMA multiple access method, scrambling as well as modulation and demodulation based on the QPSK modulation method. The base stations and the mobile stations in the UMTS mobile radio system for this purpose each have dedicated data processing devices and at least one central data processing device. The dedicated data processing devices are connected to one another and are connected to the central data processing device such that they can interchange data.

The central data processing device, the dedicated data processing devices etc. are normally provided on a baseband chip. In the case of the base stations and the mobile stations in the UMTS mobile radio system, by way of example, the central data processing device is a digital signal processor (DSP) in order to carry out the complex calculation functions in a communication protocol. The DSP programs the dedicated data processing devices to carry out specific defined functions with the aid of internal locally available registers or memories, which are provided for storage of parameters. The dedicated data processing devices, for example in the case of the UMTS mobile radio system, have a RAKE receiver, a search apparatus or a searcher, a channel decoder and a transmission part. A transmission (TX) modulator is a central block in a transmission part of a UMTS mobile station. The transmission modulator is used to produce the OVSF spreading codes and scrambling codes, for spreading and scrambling of signals on different physical channels, and for processing of the spread signals. The transmission modulator processes not only the dedicated physical data channels DPDCH but also the dedicated physical control channels DPCCH, and produces the scrambling codes for the physical channels PRACH and PCPCH.

The scrambling code $S_{dpch,n}$ for the dedicated physical data channel DPDCH and for the dedicated physical control channel DPCCH are normally produced using equations 15 and 16, and the preambles $C_{pre,n,s}$ and $C_{c-acc,n,s}$ for the physical random access channel PRACH and for the common physical packet channel PCPCH are produced using equations 18 and 23, in separate devices in the baseband chip of a mobile station. The preambles are produced as a function of the respective signature $C_{sig,s}$ using equation 20, in the digital signal processor DSP itself, and are then transmitted to the transmission modulator.

One disadvantage of the production of the scrambling codes and of the preambles in separate devices is that, although this is associated with greater independence for the control of the devices, the complexity, for example with regard to the amount of chip area consumed on a baseband chip, is, however, also greater.

A further disadvantage of the production of the scrambling codes and of the preambles in separate devices is that the production of the signature and of the preamble in the DSP and their transmission to the transmission modulator by means of an additional data transmission are associated with corresponding complexity in terms of power and control.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to an apparatus for production of scrambling codes and preambles that is less complex than the prior art and reduces the amount of data to be transmitted between a digital signal processor and a transmission modulator.

The idea on which the present invention is based includes an appreciation by the inventor that the equations 15, 16, 17, 21 and 22 for the short and long scrambling codes are the same for the physical channels DPDCH, DPCCH, PRACH and PCPCH and that the PRACH message part scrambling code from equation 17 can be derived from the scrambling code from the other physical channels by shifting through 4096 chips, and that the PRACH preamble scrambling code based on equation 19 and the PCPCH preamble scrambling code based on equation 24 can be derived directly from the real part of the long scrambling code $C_{long,n}$ based on equation 9.

Therefore according to the present invention the scrambling codes for the physical channels DPDCH, DPCCH, PRACH and PCPCH and the preambles for the physical channels PRACH and PCPCH are produced and processed in a single common apparatus, for example one hardware block, and thus the basic scrambling code need only be shifted through 4096 chips for the physical channel PRACH.

The invention is directed to an apparatus for production of scrambling codes that are used for scrambling binary signals which are transmitted in physical channels in a mobile radio system, and for production of preambles, which are sent on a physical channel in order to control the access to that particular physical channel. The apparatus comprises a scrambling code generator for production of the scrambling codes, which has at least one output at which the scrambling codes are emitted, a preamble generator for production of non-scrambling preambles, which has at least one output at which the non-scrambled preambles are emitted, and at least one multiplier for scrambling the non-scrambled preambles using associated scrambling codes. Each multiplier, in one example, has a first input that is connected to the output of the scrambling code generator, a second input that is connected to the output of the preamble generator, and an output at which the preambles are emitted.

One advantage of the apparatus according to the present invention is that the production of the scrambling codes and of the preambles takes place essentially without any lead time and, for example, the data transmission rate from a DSP to a transmission modulator is reduced. This is primarily due to the fact that preambles are not produced in the digital signal processor DSP, but are produced together with the scrambling codes in a single apparatus or in a single generator, and therefore do not need to be transmitted to the transmission modulator.

A further advantage of the apparatus according to the present invention is that as many devices as possible are jointly used for transmission in the physical channels DPDCH, DPCCH, PRACH and PCPCH and for the production of the PRACH/PCPCH preambles. In particular, the PRACH/PCPCH preamble scrambling codes $S_{r-pre,n}$ and $S_{c-acc,n}$ are produced using the equations 19 and 24, and the scrambling codes $S_{dpch,n}$, $S_{r-msg,n}$ and $S_{c-msg,n}$ are produced on the basis of the equations 15, 16, 17, 21 and 22 for the physical channels DPDCH, DPCCH, PRACH and PCPCH, using the same scrambling code generator.

A further advantage of the apparatus according to the present invention is that the apparatus, in one example, is not operated any faster than the UMTS chip clock, thus avoiding additional power consumption. The codes mentioned above are defined on the basis of UMTS chips and are thus at a data rate of 3.84 MHz. The clock or clock supply does not require any additional clocks, that is to say the entire apparatus is clocked at 3.84 MHz, in this example.

A further advantage of the apparatus according to the present invention is that, in one example, all the arithmetic operations that are required for production of the preambles and of the scrambling codes are carried out efficiently by means of elementary bit operations in the apparatus according to the invention. The complexity for production of the PRACH/PCPCH preambles is extremely low since, for example, the exponential term which is included in the equations 18 and 23 for the PRACH preamble $C_{pre,n,s}$ and for the PCPCH preamble $C_{c-acc,n,s}$ can be produced directly using simple bit operations.

A further advantage of the apparatus according to the present invention is that the majority of the elementary bit operations are carried out in hardware, for example in a specially designed circuit which is referred to as dedicated hardware. Individual AND, OR or XOR circuits, etc. can be defined separately in a circuit such as this. It is thus possible to define the number of bits used for calculation purposes precisely for all of the logic links. This is also advantageous since the scrambling codes, the spreading codes and the preambles are complex signals which can assume only the values −1 and 1 and can thus be processed directly, in binary form. Furthermore, elementary bit operations such as bit inversion are carried out substantially more efficiently in hardware than in a DSP.

According to one exemplary embodiment of the invention, the scrambling code generator has a scrambling code generator for production of long scrambling codes, and a scrambling code generator for production of short scrambling codes.

One advantage of this embodiment is that a single scrambling code generator, that is to say by way of example one hardware block, is used for production of both short and long scrambling codes, and this represents a simplification over the prior art.

According to a further aspect of the invention, the scrambling code generator for production of long scrambling codes has a device for shifting binary code sequences in time, from which code sequences the scrambling codes are formed, with the device shifting the binary code sequences in time as a function of the associated physical channels.

According to a further exemplary embodiment of the invention, the scrambling code generator for production of long scrambling codes has a shift register for production of the binary code sequences.

According to another embodiment of the invention, the apparatus comprises a device for shifting in time, and such device includes registers for reading bit tables and AND circuits for bit-by-bit AND linking of code sequences with bits in the bit tables in order to shift the code sequences in time, wherein the AND circuits have inputs which are connected to outputs of the registers and outputs of the shift registers, and have outputs at which the shifted code sequences are emitted.

One advantage of this exemplary embodiment is that the shifting of the basic scrambling code through 4096 chips which is required for production of the scrambling code is carried out by the use of controlled registers and AND circuits easily and directly without any time loss, since the shifting process is carried out by means of register masks and bit tables, which drive the registers and AND circuits, respectively.

According to another aspect of the apparatus, the scrambling code generator for production of long scrambling codes comprises a device for forming scrambling codes from the code sequences, wherein the device has inputs which are connected to the outputs of the AND circuits and has at least one output at which the scrambling codes are emitted.

According to another aspect of the apparatus, the device for construction of the scrambling codes from the code sequences comprises exclusive OR (XOR) circuits.

According to a further aspect of the apparatus, the physical channels are transmitted via the real in-phase branch and/or via the imaginary quadrature branch of a modulation method using four-phase keying (QPSK).

According to another exemplary embodiment of the invention, one of the outputs of the scrambling code generator, which is associated with the in-phase branch of the QPSK modulation method, is connected to the first input of each multiplier.

According to yet another embodiment of the invention, the apparatus is used in a transmitting/receiving station in a mobile radio system.

According to still another embodiment of the invention, the transmitting/receiving station comprises a mobile station in a UMTS mobile radio system.

According to another aspect of the apparatus, the physical channels are the physical channels DPDCH, DPCCH, PRACH and PCPCH in the UMTS mobile radio system, and the binary code sequences are shifted by the device for shifting in time such that the long scrambling codes for the physical channel PRACH are shifted through 4096 chips in time.

One advantage of this aspect of the invention is that the PRACH/PCPCH preambles are not, by way of example, produced by the DSP but by the apparatus according to the invention within a transmission modulator. This considerably reduces the amount of data transmission from the DSP to the transmission modulator with, essentially, only the number of the signature now being transmitted, which is preferably done directly by means of a control register.

BRIEF DESCRIPTION OF THE DRAWINGS

Preferred exemplary embodiments of the present invention will be explained in more detail in the following text with reference to the attached drawings, in which.

DETAILED DESCRIPTION OF THE INVENTION

Figure 1:
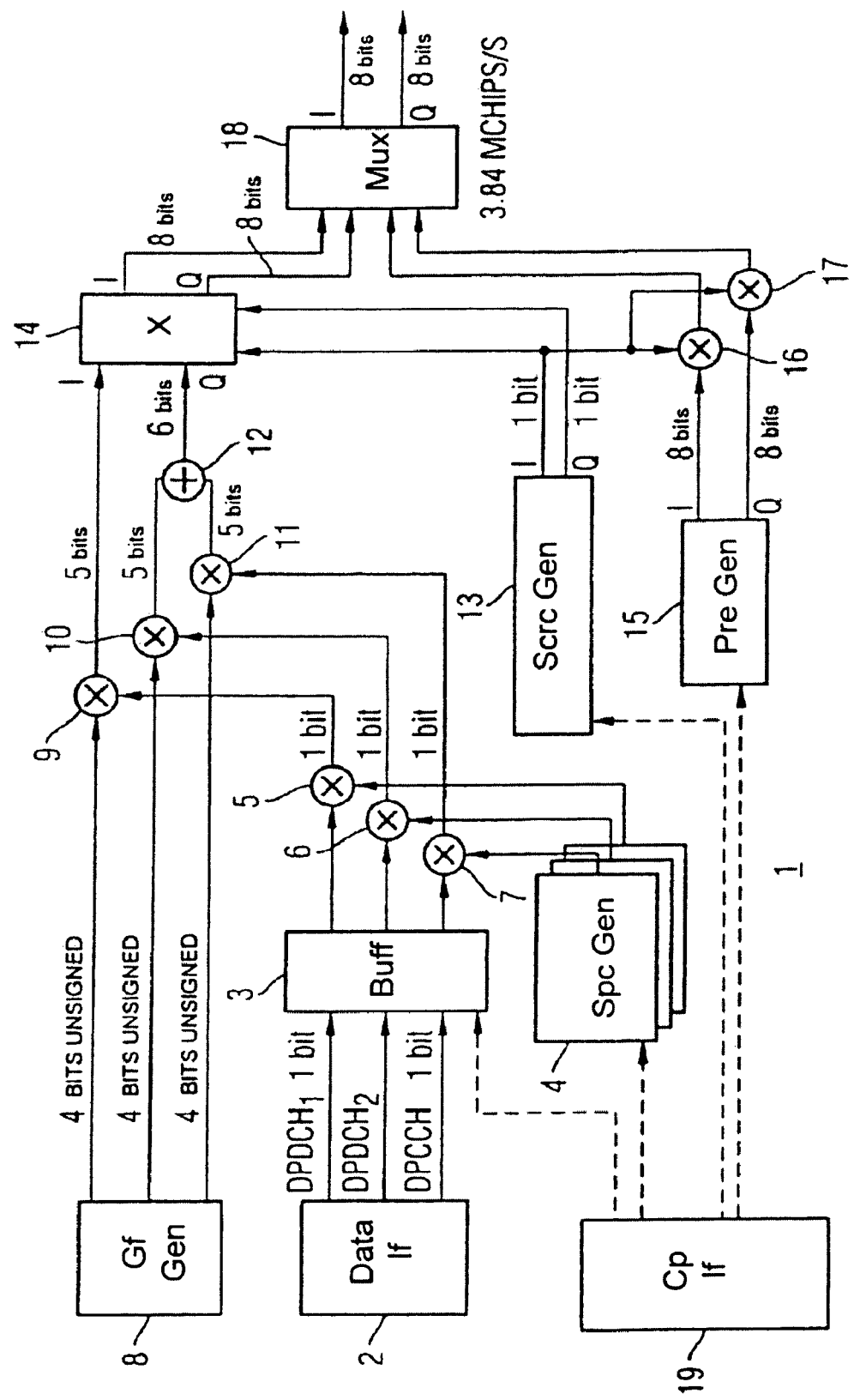
FIG. 1 shows one exemplary embodiment of an apparatus for production of scrambling codes and preambles according to the invention.

FIG. 1 shows an exemplary embodiment of an apparatus 1 for production of scrambling codes and preambles according to the invention. The apparatus 1, such as a generator, can be used in a transmission modulator in a mobile station and has a data interface 2, a buffer store 3, a spreading code generator 4, multipliers 5, 6 and 7, a gain factor generator 8, further multipliers 9, 10 and 11, an adder 12, a scrambling code generator 13, a further multiplier 14, a preamble generator 15, further multipliers 16 and 17, a selection device 18 and a control parameter interface 19.

The apparatus 1 is connected via the data interface 2 to a data bus of a digital signal processor DSP (which is not illustrated) in order to transmit data, such as 1-bit data signals, which is produced in the digital signal processor by means of physical channels $DPDCH_1$, $DPDCH_2$ and DPCCH, etc. to the apparatus 1. Outputs of the data interface 2 are connected to inputs of the buffer store 3, which temporarily stores the data that is supplied from the data interface 2 at a specific data rate, and converts the data rate to a chip rate. The spreading code generator 4 is used in order to produce OVSF spreading codes. Outputs of the buffer store 3 and outputs of the spreading code generator 4 are connected to inputs of the multipliers 5, 6 and 7 for multiplication of the binary signals in the physical channels $DPDCH_1$, $DPDCH_2$ and DPCCH by the OVSF spreading codes, in order to spread the individual signals in the physical channels, and to produce 1-bit output signals at outputs of the multipliers 5, 6 and 7.

The gain factor generator 8 is used for production of channel-specific gain factors â, with the gain factors being quantized in the form of unsigned 4-bit words and being used in order to compensate for power differences between the individual physical channels when different spreading factors are being used, and in order to weight the physical channels in an appropriate manner. Outputs of the gain factor generator 8 and of the multipliers 5, 6 and 7 are connected to inputs of the multipliers 9, 10 and 11 for multiplication of the spread binary signals on the physical channels $DPDCH_1$, $DPDCH_2$ and DPCCH by the respective gain factor, in order to produce 5-bit output signals at outputs of the multipliers 9, 10 and 11.

The following adder 12 adds the spread and weighted binary signal in the physical channel DPCCH, which is applied to one input of the adder 12, and the spread and weighted binary signal in the physical channel $DPDCH_2$, which is applied to a further input of the adder 12, in order to produce a 6-bit output signal at one of its outputs. The physical channels $DPDCH_1$ and $DPDCH_2$ are thus uniformly distributed between the in-phase branch (I) and the quadrature branch (Q) of the QPSK modulation method.

The scrambling code generator 13 in this exemplary embodiment produces scrambling codes for the physical channels DPDCH and DPCCH and for the preambles of the physical channels PRACH and PCPCH. The scrambling code generator 13 produces two 1-bit output signals for the in-phase branch (I) and for the quadrature branch (Q) of the QPSK modulation method at the outputs thereof, and is connected to inputs of the multiplier 14. The multiplier 14 multiplies the spread and weighted binary signals from the physical channels by the complex scrambling code, in order to produce scrambled 8-bit output signals in the in-phase branch (I) and in the quadrature branch (Q) of the QPSK modulation method at outputs which are associated therewith.

The preamble generator 15 produces the non-scrambled preambles for the physical channels PRACH and PCPCH, that is to say the signatures of the preambles based on equations 18 and 23 multiplied by an exponential term, and produces two 8-bit output signals for the in-phase branch and for the quadrature branch of the QPSK modulation method at outputs thereof. The preamble generator 15 is connected by the outputs thereof to first inputs of the multipliers 16 and 17, and the scrambling code generator 13 is connected by means of the output thereof, which is associated with the in-phase branch (I, real part) to two inputs of the multipliers 16 and 17. The multipliers 16 and 17 scramble the unscrambled preambles using the real preamble scrambling code $c_{long,1,n}$ based on equations 19 and 24, in order to produce the preamble in accordance with the equations 18 and 20 at the outputs thereof. The selection device 18 is connected by means of inputs thereof to outputs of the multipliers 14, 16 and 17, and is used in order to select either the scrambled output signals or the scrambled preambles and to emit them. The selection device 18 is preferably a multiplexer.

The apparatus 1 receives control parameters from the digital signal processor DSP via the control parameter interface 19. The control parameter interface 19 is connected by means of an output thereof to one input of the buffer store 3 and supplies the buffer store 3 with the spreading factors, in order to carry out the conversion process between the data rate of the physical channels and the chip rate. The control parameter interface 19 is connected by means of a further output thereof to one input of the spreading code generator 4, and likewise supplies the spreading code generator 4 with the spreading factors, in order to spread the individual physical channels. The control parameter interface 19 is connected by means of a further output thereof to one input of the scrambling code generator 13, and supplies the scrambling code generator 13 with the scrambling code number and a selection signal, in order to select the long or short scrambling codes. The control parameter interface 19 is, finally, connected by means of a further output thereof to one input of the preamble generator 15, in order to supply it with a signature number for calculation of a preamble.

Figure 2:
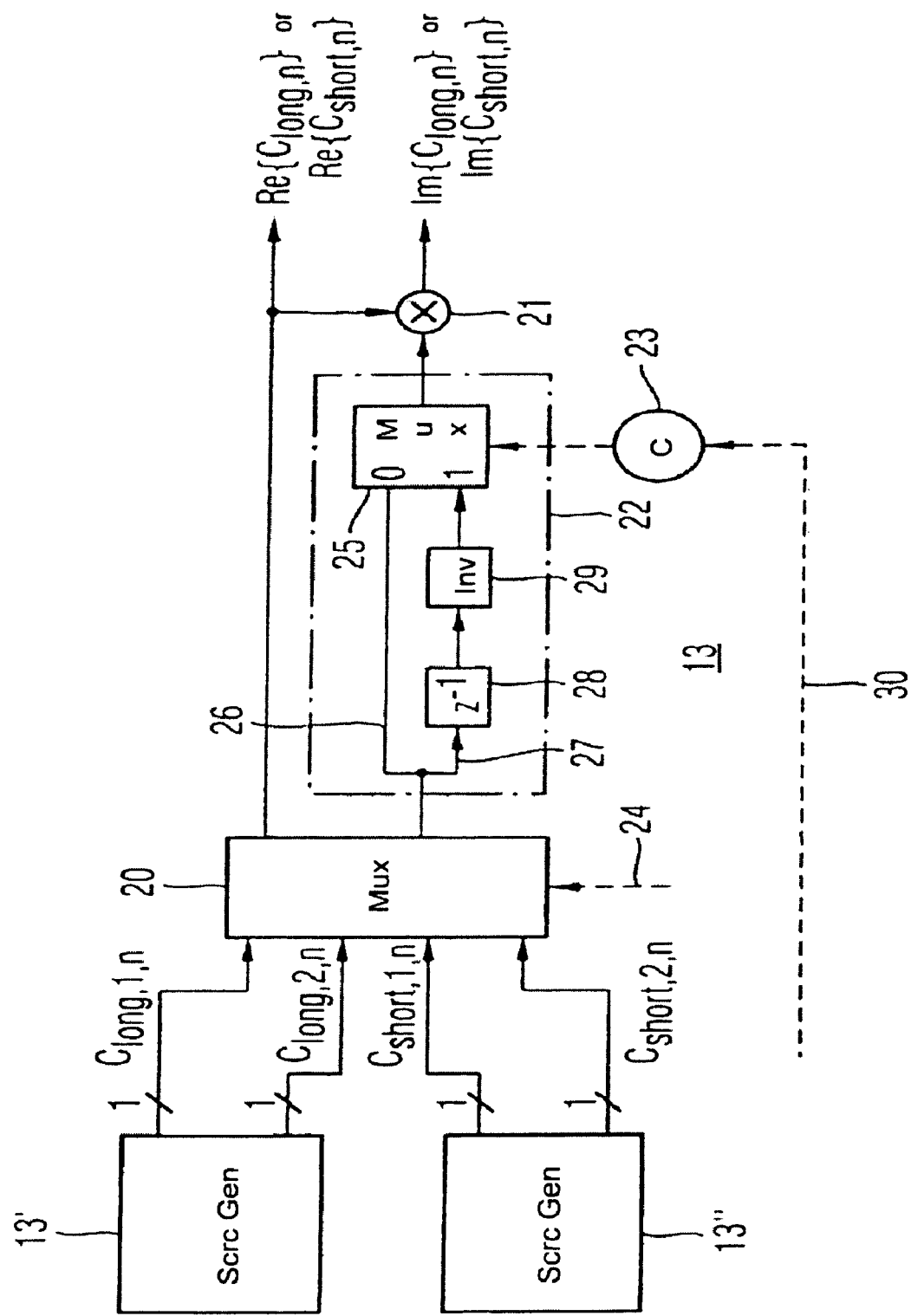
FIG. 2 shows a scrambling code generator according to the invention.

FIG. 2 shows a scrambling code generator 13 for production of scrambling codes. The scrambling code generator 13 has a first scrambling code generator 13' for production of long scrambling codes $c_{long,1,n}$ and $c_{long,2,n}$, a second scrambling code generator 13" for production of short scrambling codes $c_{short,1,n}$ and $c_{short,2,n}$, a multiplexer 20, a multiplier 21, a device 22 and a controller 23.

The first scrambling code generator 13' has outputs at which the long scrambling codes $c_{long,1,n}$ and $c_{long,2,n}$ are emitted. The second scrambling code generator 13" has outputs at which the short scrambling codes $c_{short,1,n}$ and $c_{short,2,n}$ are emitted. The outputs of the scrambling code generators 13' and 13" are connected to inputs of the multiplexer 20, which emits the first long or short scrambling code $c_{long,1,n}$ or $c_{short,1,n}$ at a first output and the second long or short scrambling code $c_{long,2,n}$ or $c_{short,2,n}$ at a second output depending on a code selection signal 24, which is applied to a further input thereof and is used for selection of the long or short scrambling codes.

The device 22 is used for production of the respective imaginary expression $j(-1)^i c_{long,2,n}(2\lfloor i/2 \rfloor)$ or $j(-1)^i c_{short,2,n}(2\lfloor (i \bmod 256)/2 \rfloor)$ in the equations 9 or 14 and has a multiplexer 25, a first branch 26 which connects one input of the device 22 directly to a first input (0) of the multiplexer 25, and a second branch 27 which connects the input of the device 22 to a second input (1) of the multiplexer 25. The second branch 27 has a delay device 28 and an inverter 29. The device 22 is connected by means of the input thereof to the second output of the multiplexer 20. The delay device 28 in the second branch 27 is connected by means of one input thereof directly to the input of the device 22, and is connected by means of an output thereof to one input of the inverter 29. In contrast, the inverter 29 has an output that is connected to the second input (1) of the multiplexer 25.

When the index i in the equations for the scrambling code is an even number, then the signal at the first input (0) of the multiplexer 25 is passed on to an output of the multiplexer 25 or of the device 22, and when the index i is an odd number, then the signal at the second input (1) of the multiplexer 25 is passed on to the output of the multiplexer 25 or of the device 22. The multiplexer 25 has a further input, to which the controller 23 is connected. The controller 23 is initialized or zeroed by means of a time frame start signal 30, which indicates the start of a time frame. The controller 23 then controls the multiplexer 25 such that the first input (0) is selected after the initialization process, followed then by the second input (1) and then once again by the first input (0) etc. of the multiplexer 25. Thus, starting with the first input of the multiplexer 25, the input signal at the first input and the input signal at the second input of the multiplexer 25 are emitted alternately at the output of the multiplexer 25.

The first output of the multiplexer 20 is connected to a first output of the scrambling code generator 13, in order to emit the real part of the long or of the short scrambling code $c_{long,n}$ and $c_{short,n}$. The first output of the multiplexer 20 is also connected to a first input of the multiplier 21, and the output of the device 22 is connected to a second input of the multiplier 21. The multiplier 21 thus multiplies the respective first scrambling code $c_{long,1,n}$ or $c_{short,1,n}$ which represents the real part of the respective long or short complex scrambling code $c_{long,n}$ or $c_{short,n}$ in the equations 9 or 14, by the imaginary expression $j(-1)^i c_{long,2,n}(2\lfloor i/2 \rfloor)$ or $j(-1)^i c_{short,2,n}(2\lfloor (i \bmod 256)/2 \rfloor)$, in order to produce the imaginary part of the long or short complex scrambling code $c_{long,n}$ or $c_{short,n}$. The imaginary part is emitted at an output of the multiplier 21 that forms a second output of the scrambling code generator.

Figure 3:
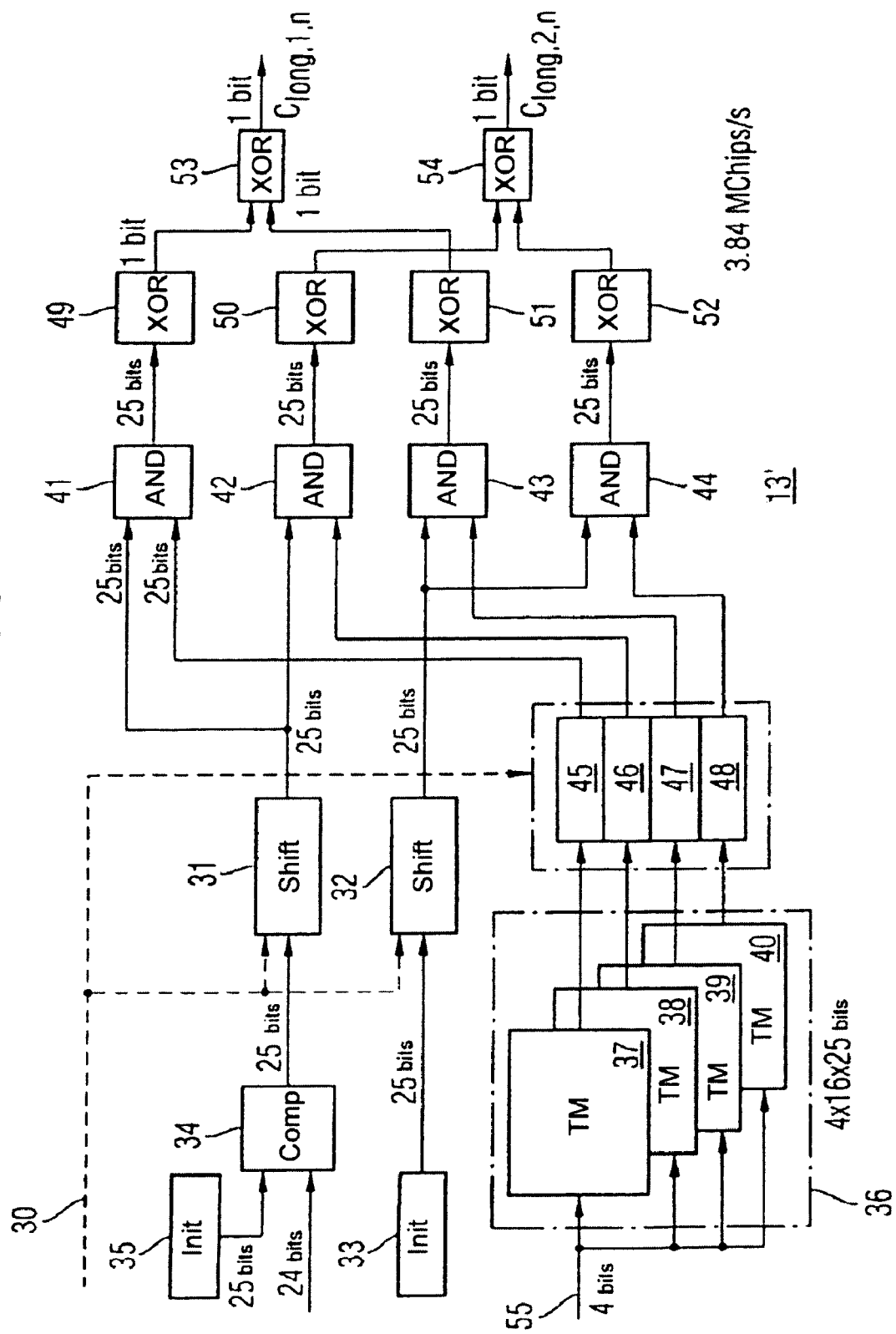
FIG. 3 shows a scrambling code generator for production of long scrambling codes according to the invention.

FIG. 3 shows a scrambling code generator 13' for production of long scrambling codes according to the invention. The scrambling code generator 13' has two shift registers 31 and 32, a device 33 for initialization, a device 34 for composition of a bit word, a device 35 for supplying an initial condition, a memory 36 with tapping masks 37, 38, 39 and 40, AND circuits 41, 42, 43 and 44 for bit-by-bit AND linking, registers 45, 46, 47 and 48 and XOR circuits 49, 50, 51, 52, 53 and 54.

Figure 5:
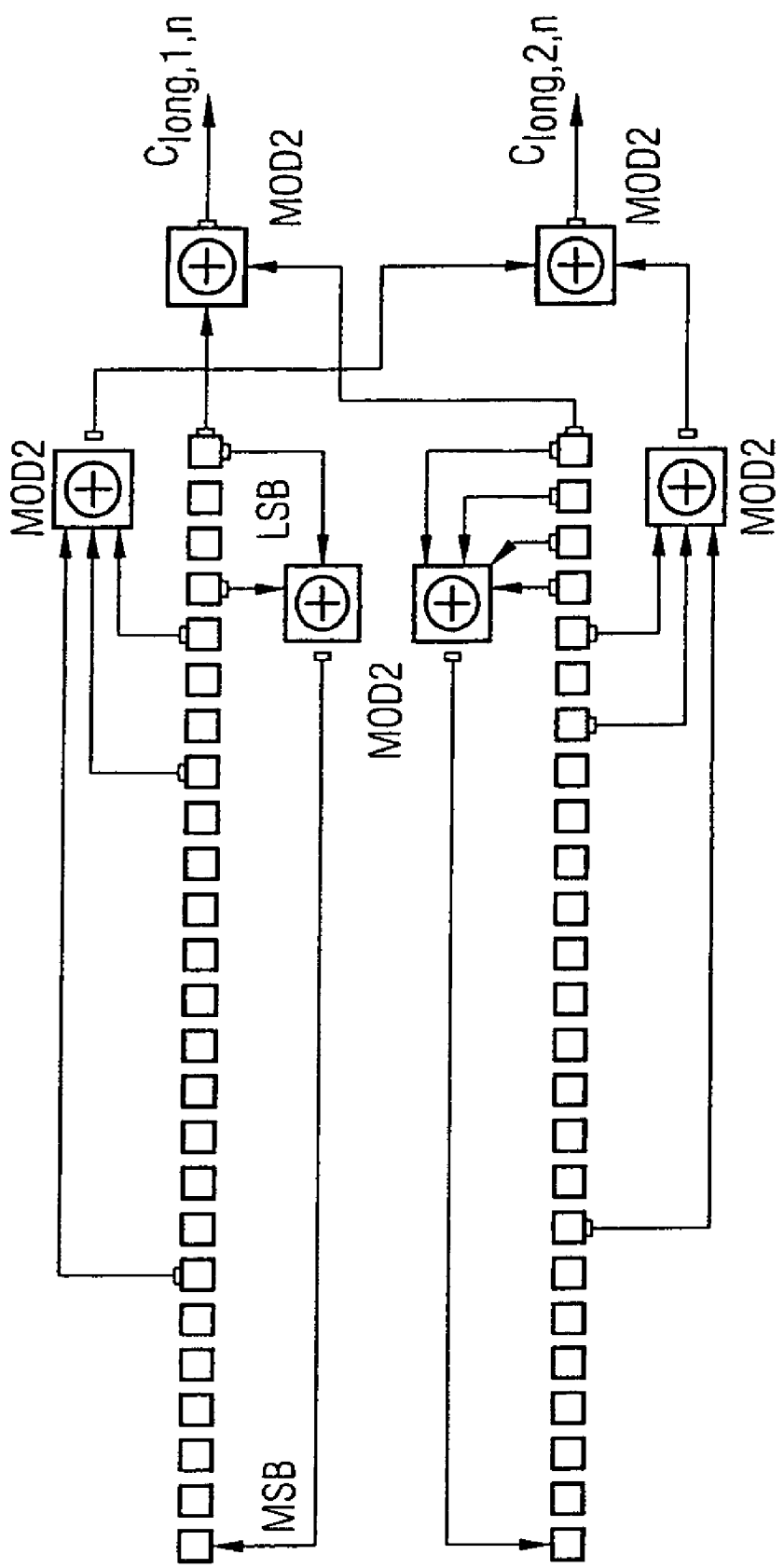
FIG. 5 shows a known generator for production of long scrambling codes for the uplink.
Figure 6:
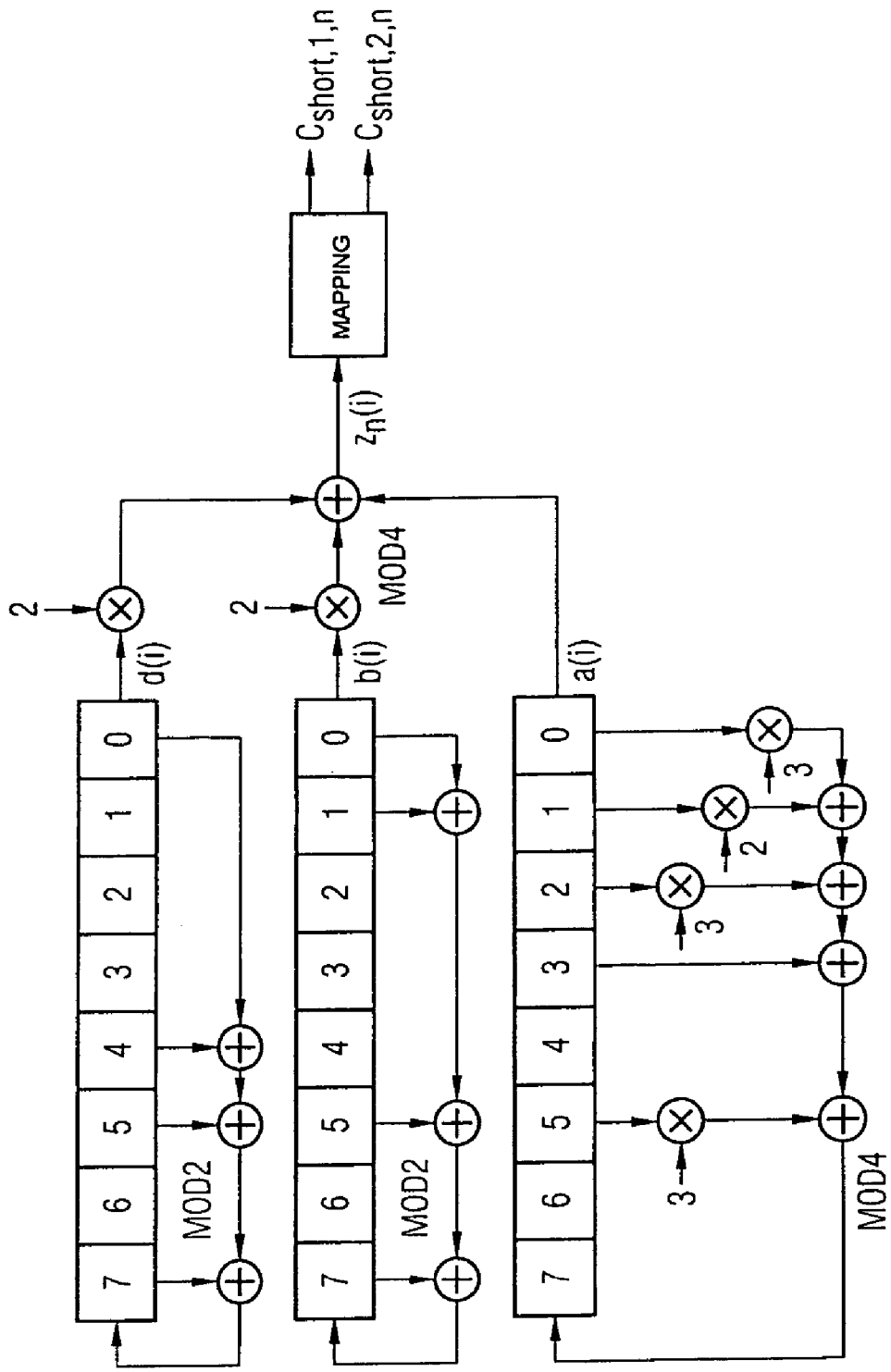
FIG. 6 shows a known generator for production of short scrambling codes for the uplink.

The shift registers 31 and 32 are used for production of the x code sequence and y code sequence as described above, and are illustrated schematically in FIG. 5. One input of the shift register 32 for the y code sequence is connected to one output of the device 33 for initialization of the shift register 32, which supplies the initial conditions (25 bits) for y on the basis of equation 2. One input of the shift register 31 for the x code sequence is connected to one output of the device 34 for composition of a bit word, which is used for initialization of the shift register 31 for the x code sequence. One input of the device 34 for composition of a bit word is connected to one output of the device 35 for supplying the initial condition for $x_n(24)$ on the basis of equation 1, and the device 34 furthermore receives the scrambling code number, which in this case has 24 bits, as an input signal at a further input. The device 34 uses the initial condition for $x_n(24)$ and the scrambling code number to compose the bit word for initialization of the shift register 31 for the x code sequence, which then has 25 bits and is emitted at the output of the device 34.

The tapping masks 37, 38, 39 and 40 are stored in the form of bit tables in the memory 36. The tapping masks 37, 38, 39 and 40 are used in order to control the AND circuits 41, 42, 43 and 44. A first and a second tapping mask 37 and 38 are associated with the shift register 31 for production of the x code sequence. A third and a fourth tapping mask 39 and 40 are associated with the shift register 32 for production of the y code sequence. The memory 36 preferably has a read only memory (ROM), in which four bit tables with 16×25 bits are stored, that is to say 25 bits are provided for the x and y code sequences, and 16 possible values can be calculated for a shift through 4096 chips. Outputs of the memory 36 are connected to respective inputs of the registers 45, 46, 47 and 48, with a first and a second register 45 and 46 being associated with the shift register 31 for production of the x code sequence, and a third and a fourth register 47 and 48 being associated with the shift register 32 for production of the y code sequence.

The bit table for the first tapping mask 37 is written to the first register 45, and the bit table for the second tapping mask 38 is written to the second register 46. The bit table for the third tapping mask 39 is written to the third register 47, and the bit table for the fourth tapping mask 40 is written to the fourth register 48. One output of the shift register 31 for production of the x code sequence and outputs of the first and of the second register 45 and 46 are connected to inputs of a first and of a second AND circuit 41 and 42, respectively. One output of the shift register 32 for production of the y code sequence and outputs of the third and of the fourth register 47 and 48 are connected to inputs of a third and of a fourth AND circuit 43 and 44, respectively. The AND circuits 41, 42, 43 and 44 are used in order to pass on just the bits in the x and y code sequences to one output of the respective AND circuit 41, 42, 43 and 44, and to use them for production of the long scrambling code, for which an associated bit is set in the bit table of the respective tapping mask 37, 38, 39 and 40, for example equal to 1.

The shift through 4096 chips in equation 17 can be achieved by suitable selection of the bits in the tapping masks 37, 38, 39 and 40, and the scrambling code generator 13' may be used not only for production of scrambling codes for the physical channels DPDCH, DPCCH and PCPCH but also for the physical channel PRACH and, in conjunction with the preamble generator 15 shown in FIG. 1, for production not only of preambles for the physical channel PCPCH but also for the physical channel PRACH. The choice of the bits results from a calculation in polynomial rings and is, for example, for the first register 45: 0 0 1 1 1 1 1 1 0 1 1 1 0 1 1 0 0 1 1 1 0 1 1 1 0.

One output of the first AND circuit 41 is connected to one input of a first XOR circuit 49 for XOR linking. One output of the second AND circuit 42 is connected to one input of a second XOR circuit 50. One output of the third AND circuit 43 is connected to one input of a third XOR circuit 51. And one output of the fourth AND circuit 44 is connected to one input of a fourth XOR circuit 52. Outputs of the first and of the third XOR circuit 49 and 51 are connected to inputs of a fifth XOR circuit 53, and outputs of the second and of the fourth XOR circuit 50 and 52 are connected to inputs of a sixth XOR circuit 54. The connections between the XOR circuits 49, 50, 51, 52, 53 and 54 are used in order to produce a sum of equation 5 and the long scrambling codes $c_{long,1,n}$ and $c_{long,2,n}$ from the equations 7 and 8 from the 25-bit output signals from the AND circuits 41, 42, 43 and 44.

During operation of the scrambling code generator 13', a signal 55 to the memory 36 is used to indicate to it, at one input, whether the scrambling code and the preamble for the physical channel PRACH should be produced and whether a shift is required in the scrambling code which was originally produced for the physical channels DPDCH, DPCCH and PCPCH. The shift is written from the DSP to a control register, which is read once again at the start of each time frame. In this case, the signal 55 preferably has four bits, which are used for the 16 possible shifts. Furthermore, the start of a time frame is indicated to the shift registers 31 and 32 and to the registers 45, 46, 47 and 48 via the time frame start signal 30. The 25-bit content of the registers 45, 46, 47 and 48 is updated in each chip.

Figure 4:
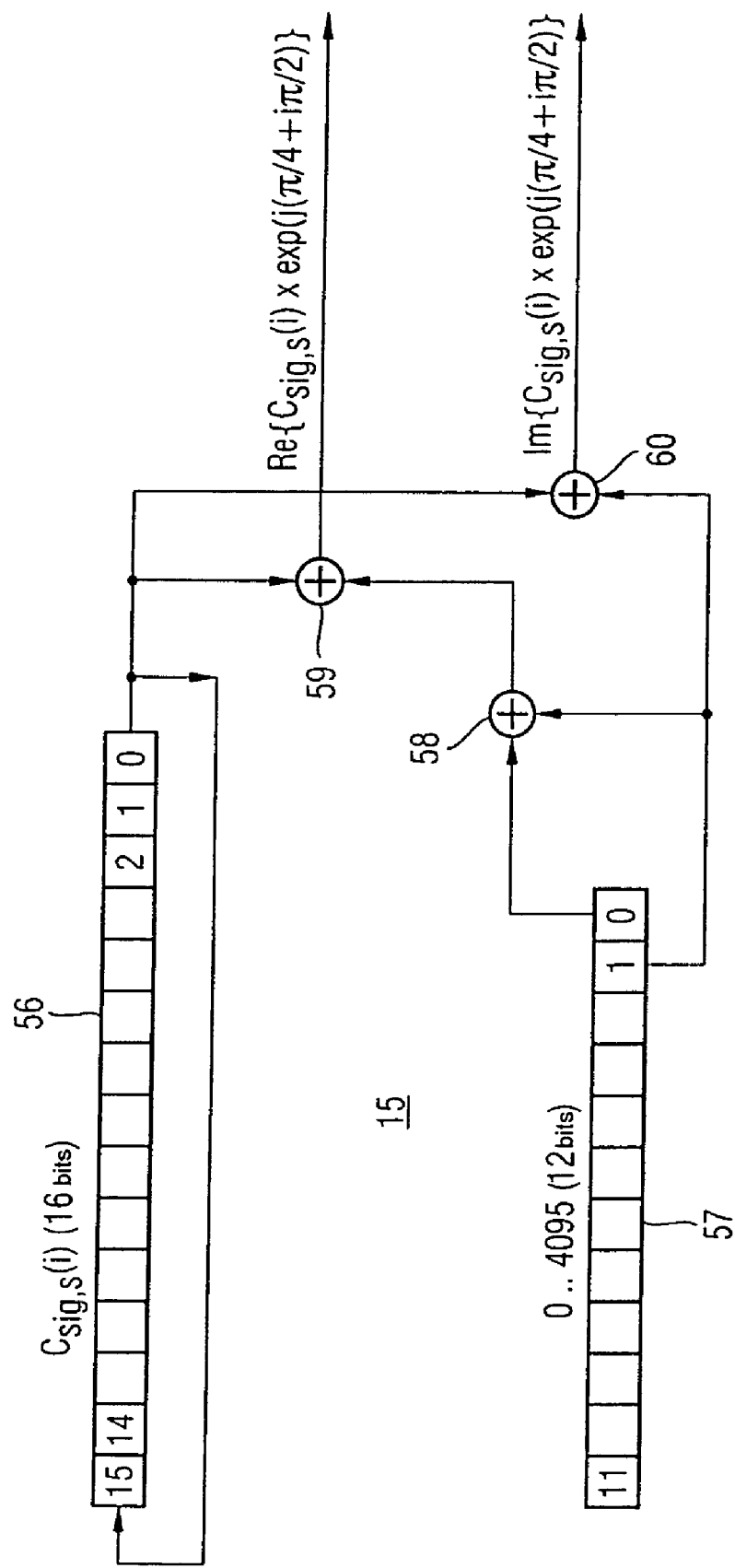
FIG. 4 shows, schematically, a preamble generator for production of non-scrambled preambles according to the invention.

FIG. 4 shows, schematically, a preamble generator 15 for production of non-scrambled preambles, that is to say of the signatures $c_{sig,s}$, multiplied by an exponential term, in the equations 18 and 23. The preamble generator 15 has a feedback register 56, a counter 57 and adders 58, 59 and 60.

The register 56 produces a 16-chip preamble signature $c_{sig,s}$ based on equation 20 at one output thereof, which is repeated 256 times for an index i=0, 1, ..., 4095. The counter 57 is used not only to count the length of a preamble in chips and to increment the index i, but also to produce a signal for formation of the exponential function in the equations 18 and 23 as a function of the index i. The first two bits 0 and 1 of the counter 57 are applied to two inputs of a first adder 58. One output of the first adder 58 is connected to a first input of a second adder 59. A second input of the second adder 59 is connected to one output of the register 56. The second adder 59 produces, at one output thereof, the real part of $C_{sig,s}(i) \times \exp(j(\pi/4 + i\pi/2))$ in the equations 18 and 23. Furthermore, the output of the register 56 is connected to a first input of a third adder 60. The second bit (1) of the counter 57 is applied to a second input of the third adder 60, and the third adder 60 produces, at an output thereof, the imaginary part of $C_{sig,s}$ (i)×exp(j($\pi$/4+i$\pi$/2)) in the equations 18 and 23. The adders 58, 59 and 60 thus produce the rotation for the real part and the imaginary part of $c_{sig,s}$ (k)×exp (j($\pi$/4+k$\pi$/2)).

As can be seen, the production of the preamble in hardware involves virtually no complexity. The use of a preamble generator is thus considerably more advantageous than transmission of the data from a DSP to a generator. In conjunction with the apparatus illustrated in FIG. 1, this results in a very advantageous structure, whose concept of common hardware results in a high proportion of re-use, and simple control via a control register.

Although the present invention has been described above with reference to a preferred exemplary embodiment, it is not restricted to this but can be modified in many ways.

The apparatus according to the invention is used in alternative exemplary embodiments in transmitting/receiving stations in any desired mobile radio systems in which scrambled physical channels and preambles are used. Such transmitting/receiving stations are, for example, a mobile station, a base station etc. in a UMTS mobile radio system. The apparatus according to the invention is preferably integrated in a transmission modulator on a baseband chip. The functions of the tapping masks, registers, AND circuits and XOR circuits in FIG. 3 may also be implemented by other devices and logic circuits that are known to those skilled in the art.

The invention claimed is:

1. An apparatus for production of scrambling codes used for scrambling binary signals that are transmitted in physical channels in a mobile radio system, and for production of preambles sent on a physical channel in order to control the access to that particular physical channel, comprising:
    a scrambling code generator configured to generate scrambling codes, and comprising at least one output at which the scrambling codes are emitted;
    a preamble generator configured to generate non-scrambled preambles, and comprising at least one output at which the non-scrambled preambles are emitted; and
    at least one multiplier configured to scramble the non-scrambled preambles using associated scrambling codes from the scrambling code generator, wherein each multiplier comprises a first input, which is connected to the output of the scrambling code generator, a second input, which is connected to the output of the preamble generator, and an output at which the scrambled preambles are emitted;
    wherein the scrambling code generator comprises a device configured to shift binary code sequences in time, from which code sequences the scrambling codes are formed, and wherein the device shifts the binary code sequences in time as a function of associated physical channels.

2. The apparatus of claim 1, wherein the scrambling code generator comprises a long scrambling code generator configured to generate long scrambling codes, and a short scrambling code generator configured to generate short scrambling codes.

3. The apparatus of claim 2, wherein the long scrambling code generator comprises a shift register configured to produce the binary code sequences.

4. The apparatus of claim 3, wherein the shifting device configured to shift the binary code sequences comprises:
    registers configured to read bit tables; and
    AND circuits configured to perform bit-by-bit AND linking of binary code sequences from the shift register with bits read from the bit tables in order to shift the code sequences in time, wherein the AND circuits comprise inputs which are connected to outputs of the registers and an output of the shift register, and comprising outputs at which the shifted code sequences are emitted.

5. The apparatus of claim 4, wherein the long scrambling code generator comprises a device configured to form scrambling codes from the shifted code sequences, wherein the scrambling code formation device comprises inputs which are connected to the outputs of the AND circuits and comprises at least one output at which the scrambling codes are emitted.

6. The apparatus of claim 5, wherein the scrambling code formation device comprises a plurality of exclusive OR (XOR) circuits.

7. The apparatus of claim 2, wherein the physical channels comprise the physical channels DPDCH, DPCCH, PRACH and PCPCH in the UMTS mobile radio system, and the binary code sequences are shifted in time by the shifting device such that the long scrambling codes for the physical channel PRACH are shifted through 4096 chips in time.

8. The apparatus of claim 1, wherein the scrambled binary signals are transmitted over the physical channels via a real in-phase branch or via an imaginary quadrature branch, or both, of a modulation method using four-phase keying (QPSK).

9. The apparatus of claim 8, wherein one of the outputs of the scrambling code generator that is associated with the in-phase branch of the QPSK modulation method, is connected to the first input of each multiplier.

10. A scrambling code and preamble generator, comprising:
    a scrambling code generator configured to generate scrambling codes for a plurality of physical channels in a mobile radio system, wherein the scrambling codes are operable to scramble a complex sum signal;
    a preamble generator configured to generate non-scrambled preambles for a subset of the plurality of physical channels; and
    a multiplier circuit operably coupled to the scrambling code generator and the preamble generator, wherein the multiplier circuit is configured to multiply a scrambling code generated by the scrambling code generator with a non-scrambled preamble generated by the preamble generator, and thereby generate a scrambled preamble;
    wherein the scrambling code generator comprises a device configured to shift binary code sequences in time, from which code sequences the scrambling codes are formed, and wherein the device shifts the binary code sequences in time as a function of associated physical channels.

11. The scrambling code and preamble generator of claim 10, wherein the multiplier circuit is configured to scramble the non-scrambled preamble using a real part of a complex scrambling code from the scrambling code generator.

12. The scrambling code and preamble generator of claim 10, wherein the preamble generator is configured to generate the preamble based on a signature number received from an external processor.

13. The scrambling code and preamble generator of claim 10, wherein the scrambling code generator is configured to generate one of a long scrambling code and a short scrambling code based on a scrambling code number and selection signal received from an external processor.

14. The scrambling code and preamble generator of claim 10, wherein the scrambling code generator comprises a long scrambling code generator and a short scrambling code generator, wherein the long scrambling code generator comprises:

first and second shift registers configured to output x code and y code binary sequences, respectively;

a memory comprising a bit table containing tapping mask data associated with the first and second shift registers, respectively; and AND logic circuits configured to logically AND together the tapping mask data from the memory and the x code and y code binary sequences from the shift registers to thereby selectively pass bits of the x code and y code binary sequences for production of the long scrambling codes.

15. A mobile station, comprising:

a transmission modulator; and a digital signal processor configured to transmit a spreading factor, a scrambling code number, a signature number, and data associated with physical channels to the transmission modulator, wherein the transmission modulator comprises:

a scrambling code generator configured to generate scrambling codes based on the scrambling code number from the digital signal processor;

a preamble generator configured to generate non-scrambled preambles based on the signature number received by the digital signal processor;

wherein the transmission modulator is further configured to scramble the non-scrambled preambles using the generated scrambling codes therein;

wherein the scrambling code generator comprises a device configured to shift binary code sequences in time, from which code sequences the scrambling codes are formed, and wherein the device shifts the binary code sequences in time as a function of associated physical channels.

16. The mobile station of claim 15, wherein the transmission modulator further comprises:

a spreading code generator configured to generate spreading codes based on the spreading factor from the digital signal processor;

a spreading circuit configured to spread the data received from the digital signal processor using a spreading code received from the spreading code generator;

a gain factor generator configured to selectively compensate for power differences between individual physical channels by generating a plurality of gain factors uniquely associated with the individual physical channels;

a gain application circuit configured to apply the gain factors to the spread data associated with the physical channels to generate compensated spread data; and a scrambling circuit configured to scramble the compensated spread data using a scrambling code generated by the scrambling code generator, thereby generating scrambled output data.

17. The mobile station of claim 16, wherein the transmission modulator further comprises:

a multiplexer configured to selectively pass one of the scrambled output data and the scrambled preambles to an output thereof; and a modulator configured to perform four phase keying (QPSK) modulation of the scrambled output data or the scrambled preambles received from the multiplexer.

18. The mobile station of claim 15, wherein the scrambling code generator comprises a long scrambling code generator and a short scrambling code generator, wherein the long scrambling code generator comprises:

first and second shift registers configured to output x code and y code binary sequences, respectively;

a memory comprising a bit table containing tapping mask data associated with the first and second shift registers, respectively; and AND logic circuits configured to logically AND together the tapping mask data from the memory and the x code and y code binary sequences from the shift registers to thereby selectively pass bits of the x code and y code binary sequences for production of the long scrambling codes.

19. The mobile station of claim 15, wherein the transmission modulator circuit further comprises a multiplier circuit configured to multiply bit by bit a scrambling code from the scrambling code generator and a non-scrambled preamble from the preamble generator, wherein an output of the multiplier circuit comprises a scrambled preamble.

* * * * *